US006635870B1

(12) United States Patent
Pachuta et al.

(10) Patent No.: US 6,635,870 B1
(45) Date of Patent: Oct. 21, 2003

(54) METHOD AND APPARATUS FOR MOLECULAR ANALYSIS OF BURIED LAYERS

(75) Inventors: Steven John Pachuta, Eagan, MN (US); Vivian Wynne Jones, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/425,587

(22) Filed: Oct. 22, 1999

(51) Int. Cl.$^7$ .......................... G21K 7/00; G01N 19/02; G01B 5/28
(52) U.S. Cl. .................. 250/306; 250/307; 73/104; 73/105
(58) Field of Search .................. 250/250, 307, 250/310, 311, 306, 316; 73/104, 105

(56) References Cited

U.S. PATENT DOCUMENTS

| | | | |
|---|---|---|---|
| 5,210,425 A | | 5/1993 | Delawski et al. |
| 5,621,211 A | | 4/1997 | Spence |
| 5,831,181 A | | 11/1998 | Majumdar et al. |
| 5,922,214 A | * | 7/1999 | Liu et al. .................. 216/2 |
| 6,124,142 A | * | 9/2000 | Fujino et al. .................. 438/18 |
| 6,131,580 A | * | 10/2000 | Ratner et al. .................. 128/898 |
| 6,337,479 B1 | * | 1/2002 | Kley .................. 250/234 |

FOREIGN PATENT DOCUMENTS

| | | |
|---|---|---|
| EP | 0 721 101 A2 | 7/1996 |
| EP | 0 899 561 A1 | 3/1999 |

OTHER PUBLICATIONS

Memmert, U., Hodel, U., Hartmann, U.; "Combined Ultra-high Vacuum Scanning Tunneling Microscope Scanning Electron Microscope System", *Rev. Sci. Instrum.*, vol. 67, (6), pp. 2269–2273, Jun. 1996.

"SPM Techniques Evolve Rapidly Using Diverse Probe Materials", *R&D Magazine*, pp. 35–38, Apr. 1999.

Hues, S. M., Draper, C. F., Colton, R. J.; "Measurement Of Nanomechanical Properties Of Metals Using The Atomic Force Microscope", *J. Vac. Sci. Technol.*, B, vol. 12, No. 3, pp. 2211–2214, May/Jun. 1994.

Fuhihira, M. et al.; "Scanning Prove Microscopies For Molecular Photodiodes", *Thin Solid Films*, vol. 273, 1996, pp. 163–176.

Chen, X., et al.; "Combined Surface Plasmon Resonance and Scanning Force Microscope Instrument", *Journal Of Vacuum Science and Technology*, Part B, vol. 14, No. 3, May 1996, pp. 1582–1586.

Stavrev, M., et al.; "Sputtering of Tantalum–based Diffusion Barriers in Si/Cu Metallization: Effects of Gas Pressure and Composition", *Applied Surface Science*, vol. 91, 1995, pp. 257–262.

Sohn, L. L., et al.; "Fabrication of Nanostructures Using Atomic–force–microscope–based Lithography", *Applied Physics Letters*, vol. 67, No. 11, Sep. 11, 1996, pp. 1552–1554.

Leadley, S. R., et al.; "The Use of SIMS, XPS and in situ AFM to Prove the Acid Catalyzed Hydrolysis of poly–(orthoesters)", *Biomaterials*, vol. 19, 1998, pp. 1353–1360.

Perez–Rodriquez, A. et al.; "Physical Techniques for Silicon Layer Analysis", *Microelectronic Engineering*, vol. 40, 1998, pp. 223–227.

\* cited by examiner

Primary Examiner—John R. Lee
Assistant Examiner—Kalimah Fernandez
(74) Attorney, Agent, or Firm—Philip Y. Dahl

(57) ABSTRACT

A method and apparatus are provided for the analysis of buried layers of an analyte material by: a) removing surface layers of said analyte material with an atomic force microscopy (AFM) stylus to expose a buried layer; and b) analyzing a buried layer, preferably for molecular structure. An apparatus is provided which encompasses both AFM and one or more additional surface analytical apparati within a controlled atmosphere under coordinated computer control.

6 Claims, 5 Drawing Sheets

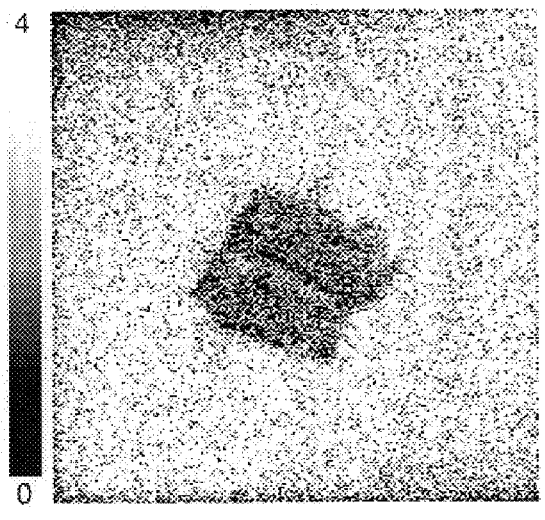 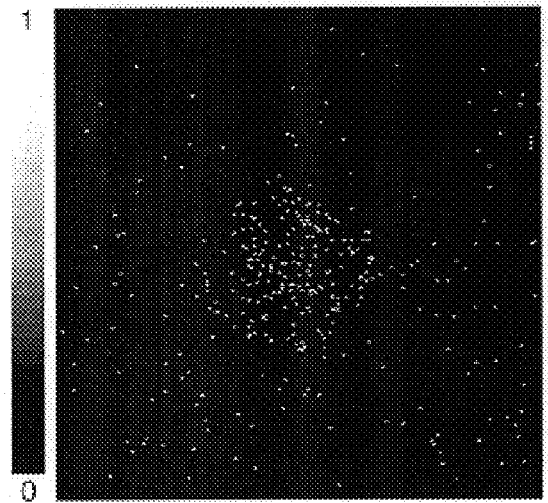
Mass 29 ($C_2H_5^+$)
*Fig. 2A*
Mass 104 ($C_7H_4O^+$)
*Fig. 2B*

METHOD AND APPARATUS FOR MOLECULAR ANALYSIS OF BURIED LAYERS

FIELD OF THE INVENTION

This invention relates to a method for the analysis of one or more buried layers of an analyte material by: a) removing one or more surface layers of said analyte material with an atomic force microscopy (AFM) stylus to expose a buried layer; and b) analyzing the buried layer.

BACKGROUND OF THE INVENTION

Methods are known for analysis of thin buried layers in a material sample which involve removal of a surface layer by chemical means, or means which cause chemical alteration in the sample. While such methods may be useful for elemental analysis, they are of very limited use for molecular analysis since they inherently involve alteration of molecular structure. One such method is sputtering, wherein the sample is treated with an ion beam in the kilovolt energy range. Since sputtering breaks intramolecular chemical bonds and destroys molecular information, sputter depth profiling is typically used for elemental analysis.

SUMMARY OF THE INVENTION

Briefly, the present invention provides a method for the analysis of one or more buried layers of an analyte material by: a) removing one or more surface layers of the analyte material with an atomic force microscopy (AFM) stylus or similar stylus apparatus to expose a buried layer; and b) analyzing the buried layer by a surface analytical technique.

In another aspect, the present invention provides an apparatus combining an atomic force microscopy (AFM) device or similar stylus device and one or more additional surface analytical devices, in particular where the apparati are housed in cooperating atmosphere-controlled chambers and under cooperating computer control.

What has not been described in the art, and is provided by the present invention, is a method for molecular analysis of buried layers of an analyte material at depths of a few Angstroms up to about 300 $\mu$m without chemical alteration of the material.

In this application:

"buried layer" includes a buried object or a segment of a buried layer or object;

"analyte" refers to a sample of material to be analyzed; and

"vacuum" means, with reference to an analytical technique performed under sub-atmospheric pressures, a sub-atmospheric pressure suitable for the practice of that technique, and is preferably less than $1.3 \times 10^{-2}$ Pa ($1 \times 10^{-4}$ torr), more preferably less than $1.3 \times 10^{-4}$ Pa ($1 \times 10^{-6}$ torr) and even more preferably less than $1.3 \times 10^{-6}$ Pa ($1 \times 10^{-8}$ torr).

It is an advantage of the present invention to provide a method and apparatus for molecular analysis of buried layers of an analyte material at depths of a few Angstroms up to about 300 $\mu$m.

BRIEF DESCRIPTION OF THE FIGURES

FIG. 2A is a time-of-flight secondary ion mass spectrometric (TOF-SIMS) image, with grey scale bar showing ion counts, taken according to the method of the present invention.

FIG. 2B is a TOF-SIMS image, with grey scale bar showing ion counts, taken according to the method of the present invention.

DETAILED DESCRIPTION OF PREFERRED EMBODIMENTS

Figure 1:
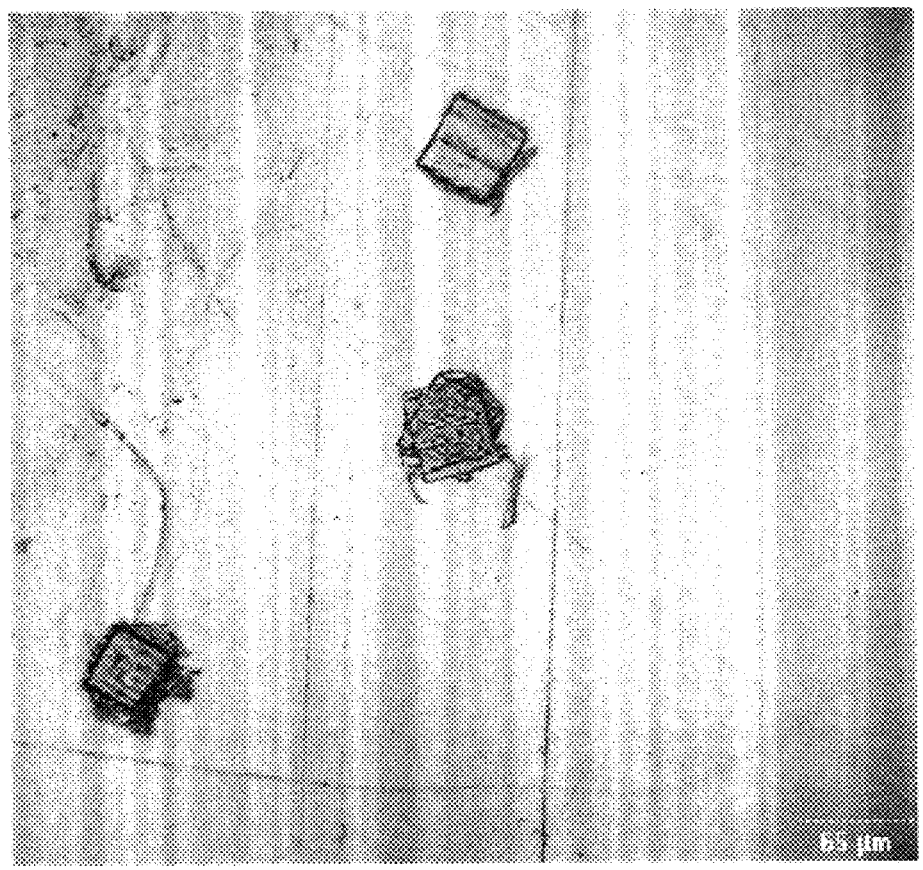
FIG. 1 is an optical micrograph, with scale bar included, of a sample treated according to the method of the present invention.

The present invention provides a method for the analysis of a buried layer of an analyte material by: a) removing a surface layer of the analyte material with an atomic force microscopy (AFM) stylus or similar stylus apparatus to expose the buried layer; and b) analyzing the buried layer by a surface analytical technique such as time-of-flight secondary ion mass spectrometry (TOF-SIMS).

The analyte material may be any material that may be physically etched at a nanometer scale. The analyte material may be organic or inorganic. The species detected in the analysis may be either atomic or molecular. Advantageously, the detected species is molecular since the method employed to expose the target layer is not substantially destructive of molecular structure.

An advantage of the method of the present invention is that it may be applied to very thin buried target layers. Preferably the buried target layer is less than 10 $\mu$m in thickness on average, more preferably less than 5 $\mu$m, even more preferably less than 1 $\mu$m, and most preferably less than 0.1 $\mu$m. As used herein, "target layer" refers to the layer sought to be measured by the investigator, and thus the target layer may have arbitrarily defined borders.

The buried target layer may be buried as shallow as a few Angstroms. Preferably, the target layer is not more than 300 $\mu$m deep on average, measured as the shortest distance to the upper surface of the analyte material. More preferably, the buried layer is between 0.01 $\mu$m and 100 $\mu$m deep and most preferably between 0.1 $\mu$m and 2 $\mu$m deep. For deeply buried layers, upper covering layers may be removed by conventional techniques with the final covering layers removed according to the present invention.

A typical AFM apparatus is designed to follow the surface of an analyte material with a sharp probe at Angstrom sensitivity to record a surface contour. By use of AFM, contours reflecting individual atoms may be detected. Typically a raster pattern is used and the probe is used in "contact" or "intermittent contact" mode.

Any suitable AFM apparatus may be used in the practice of the present invention. AFM apparati are made by numerous manufacturers, including Digital Instruments, Thermomicroscopes, Molecular Imaging, Omicron, Pacific Scanning, Quesant Instrument Corporation, Burleigh, Carl Zeiss and Molecular Devices and Tools (NT-MDT). One preferred instrument is a Dimension 5000 AFM made by Digital Instruments (Santa Barbara, California). In addition, the present invention contemplates the use of a stylus instrument that is not incorporated within an AFM apparatus, which might be guided by use of an optical microscope or other means.

Any suitable probe may be used in the practice of the present invention. Suitable probes are preferably durable under conditions of use as tool for material removal. Preferred probes include silicon nitride, single crystal Si, and diamond, most preferably diamond. Typically available probes are mounted on a silicone gel during shipping, and it has been found that it is essential that they be rinsed with a solvent such as isopropyl alcohol before they are used for etching so that or silicone material does not contaminate the analysis of target buried layers.

The target area is preferably large enough to provide an acceptable analysis area, depending on the method of analysis to be used, but not so large as to unacceptably prolong the etch time. The target area is preferably at least about 5 $\mu$m in average diameter and more preferably at least about 10 $\mu$m in average diameter. The target area is preferably not more than about 1 mm in average diameter, more preferably not more than about 100 $\mu$m in average diameter, and most preferably not more than about 40 $\mu$m in average diameter. The AFM probe may be conveniently rastered in a square pattern. Preferably the target area is approximately a square of approximately 20×20 $\mu$m.

In one embodiment of the method of the present invention, a target area on the surface of the analyte material is first imaged using the AFM, preferably in "contact" or "intermittent contact" mode. After the target area is imaged, material removal is accomplished in a second pass over the target area. (As used herein throughout, material "removal" includes any relocation of material, whether the material is taken out of contact with the sample, pushed aside, or otherwise.). During the second scan, negative lift is applied to the probe with reference to the surface profile captured in the first scan. That is, the AFM apparatus is set to attempt to maintain the height of the probe with reference to the surface at a negative value, i.e. at a fixed depth beneath the surface. In this way, it is possible to indent the probe into the surface while scanning and thus use the probe as a digging tool. During this step, the probe may act as a "plow," wherein material is accumulated at the extreme ends of the raster scans.

The actual negative lift varies from the set negative lift value as a function of the flexibility of the cantilever arm which supports the probe and the resistance of the analyte material. The actual depth of the etched hole can be determined by monitoring the deflection of the cantilever relative to the value of the negative lift. Cantilever deflection measurement is a common feature of AFM apparati. Thus, the amount of indent (hole depth) can be calculated: Depth of indent (nm)=Negative-lift amount (nm)−Cantilever deflection (nm).

In another embodiment of the method of the present invention, etching is accomplished without a preliminary imaging scan. Instead, the target area is etched by scanning while maintaining a positive cantilever deflection and, therefore, an effective digging force. Preferably, the cantilever deflection, and thus the digging force, is substantially constant. Crater depth may be determined after the digging step by an AFM scan or any other suitable method.

Etching can be accomplished at any scan angle, from 0 to 360 degrees. Preferably, alternate scans are made at perpendicular angles. Additional low-force sweeping scans may be run to provide a fine finish on the target surface or to remove any residual upper-layer material. Additional AFM imaging scans may be run to determine the depth of the etched craters.

The forces involved for scraping are preferably in the range of 0.1–1000 $\mu$N. Under these conditions, a crater with a depth of several thousand A can be etched on a time scale of minutes, depending upon the material being studied. This contrasts with the forces used for standard AFM imaging, which are typically in the nanoNewton range.

Figure 5:
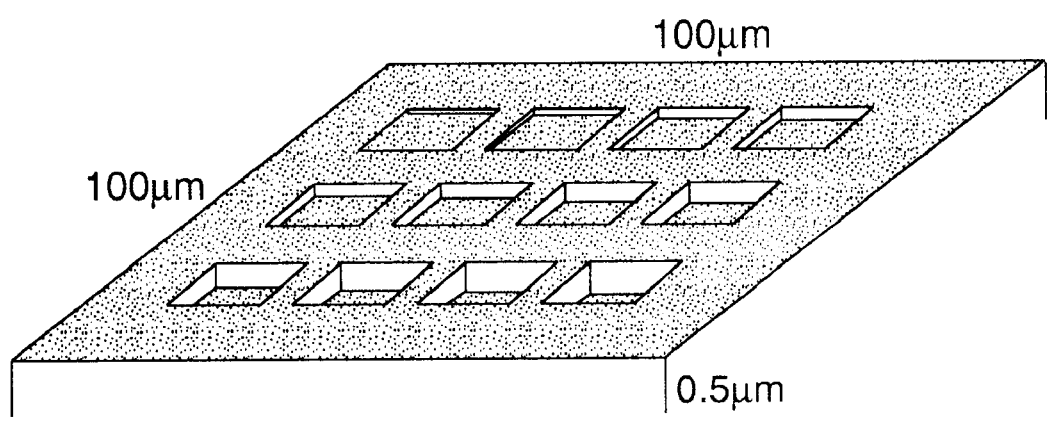
FIG. 5 is a schematic depiction of an etching pattern according to the present invention useful for depth profile analysis.

In practice it is desirable to etch a number of closely-spaced target areas to a series of varying depths in order to minimize the analysis time and allow construction of a depth profile, as represented in FIG. 5. Analysis of the crater floor materials may then be plotted against crater depth, measured by AFM, optical measurement, or other measurement, to produce a depth profile of near-surface molecular content of the sample. This method allows direct measurement of variations in organic functionality in depth ranges inaccessible to prior known techniques.

The second part of the analysis involves the use of one or more surface analytical techniques which can be used with sufficient spatial resolution to measure characteristics of the floor of the etched target area without significant interference from the surrounding unetched area. The analytical technique advantageously reveals aspects of molecular structure, since the method employed to expose the target layer is not substantially destructive of molecular structure. These techniques might include x-ray photoelectron spectroscopy (XPS), Auger electron spectroscopy, laser desorption mass spectrometry, infrared spectroscopy, and TOF-SIMS.

One preferred analytical method is TOF-SIMS. Preferred apparati include Trift™ 1 and Trift™ 2 models made by Physical Electronics, Inc. (Eden Prairie, Minn.) and Cameca TOF-SIMS IV™ made by Cameca Instruments, Inc. (Courbevoie, France). These instruments typically can analyze an area of approximately 250×250 $\mu$m with 1 $\mu$Em spatial resolution. Thus it is theoretically possible to simultaneously take TOF-SIMS data from over 140 individual closely-spaced 20×20 $\mu$m AFM craters.

It may be desirable to minimize the interaction of the freshly-etched AFM craters with the atmosphere so that chemical reactions do not occur at the newly exposed surfaces. Preferably the analyte material may be etched and analyzed under a vacuum or inert gas without exposure to the atmosphere. Thus, an apparatus is contemplated according to the present invention comprising an AFM apparatus and one or more additional surface analytical apparati, such as an x-ray photoelectron spectroscopy (XPS), Auger electron spectroscopy, laser desorption mass spectrometry, infrared spectroscopy, or TOF-SIMS apparatus, where both apparati are contained in a single chamber. The chamber may be evacuable to a vacuum, or may be gas-tight so as to contain a substantially inert atmosphere, as appropriate for the sample and analytical method involved. Alternately, the apparati may be contained in multiple chambers, either vacuum or gas-tight, equipped for movement of the sample from an AFM station to an analysis station. The AFM and additional surface analytical apparatus may then be contained in different types of chamber, e.g., an inert atmosphere chamber for AFM and a vacuum chamber for the additional surface analytical apparatus. Preferably, both apparati are under coordinated computer control, preferably by the provision of a master control computer. Preferably a master control computer also controls and coordinates any sample handling mechanisms. Preferably a master control computer also controls and coordinates any mechanisms regulating the internal atmosphere (including vacuum) of the apparatus. This apparatus according to the present invention has the unexpected benefit of performing the method described herein, and is adapted to do so with greater coordination and efficiency and without air exposure of the etched sample.

This invention is useful in the analysis at fixed depth of materials that vary in composition with depth, such as coated, layered or surface oxidized materials. This invention is particularly useful where molecular analysis is required.

Objects and advantages of this invention are further illustrated by the following example, but the particular materials and amounts thereof recited in this example, as well as other conditions and details, should not be construed to unduly limit this invention.

EXAMPLE

The AFM apparatus used in the following example was a Dimension 5000 AFM made by Digital Instruments (Santa Barbara, Calif.), using Digital Instruments Nanoscope software (version 4.42 release 2). A variety of probes proved useful in the practice of the present invention, including silicon nitride, single crystal Si, and diamond. The diamond stylus is desirable for hard materials and showed the least tip wear after use, but the other probe materials were found suitable for soft materials. In the example described below, the diamond stylus was used.

The TOF-SIMS instrument used in the following example was a Trift™ 1 model made by Physical Electronics, Inc. (Eden Prairie, Minn.) using WinCadence™ ver. 3.2 data acquisition software also made by Physical Electronics. This instruments can analyze an area of approximately 250×250 $\mu$m with 1 $\mu$m spatial resolution.

The analyte sample was Melinex® 453 film available from E.I. du Pont de Nemours and Company (Wilmington, Del.), which is a polyethylene terephthalate (PET) film coated with a surface primer layer sufficiently thick to completely obscure the underlying polyester, such that TOF-SIMS spectra of the surface showed only primer, and no polyester.

The AFM instrument was run at ambient laboratory conditions of temperature (approx. 25° C.), pressure (approx. $10^5$ Pa) and atmosphere composition. The probe used was a diamond probe Model DNISP (Digital Instruments, Santa Barbara, Calif.) having a nominal tip radius of curvature of <25 nm, and a force constant of ~150 N/m.

In the etching step, the probe was scanned in a square raster pattern approximately 45 $\mu$m on a side. The craters were etched in contact mode at 0 degrees scan angle using a fixed cantilever deflection force of between 1.5 $\mu$N and 3.0 $\mu$N, the deeper holes being etched at higher forces. The 0 degree scan was followed by a second scan wherein the identical raster pattern was repeated using a 90 degree scan angle. Scans were repeated up to 4 times, alternating 0 degree and 90 degree scans.

FIG. 1 is an optical micrograph of the AFM craters produced in this film taken through a Wild M3Z Combiscope™ (Leica Microsystems, Heidelberg, Germany) using reflected light provided by a Intralux 600™ light source (Volpi Manufacturing USA, Auburn, N.Y.). The image was recorded digitally using a Dage-MTI (Michigan City, Ind.) DC330 camera and a Flashpoint™ video frame grabber card (Integral Technologies, Indianapolis, Ind.).

The TOF-SIMS data was collected using a 15 keV pulsed Ga$^+$ primary ion beam rastered over a square area of approximately 130 $\mu$m by 130 $\mu$m. Primary ion dose was less than $10^{12}$ ions/cm$^2$. The acquisition time was five minutes.

FIGS. 2A and B are TOF-SIMS images of the sample. Both are images of the topmost crater in FIG. 1. FIG. 2A is a map of occurrence of the $C_2H_5^+$ ion, which was essentially specific to the primer coat. As the gray scale indicates, a 100% white dot represents four counts. FIG. 2B is a map of occurrence of $C_7H_4O^+$, a fragment ion of polyester appearing at m/z 104, which was largely specific to the underlying polyester material. As the gray scale indicates, a white dot represents one count. These figures demonstrate that the craters penetrated the primer to a chemically different layer.

Figure 3A:
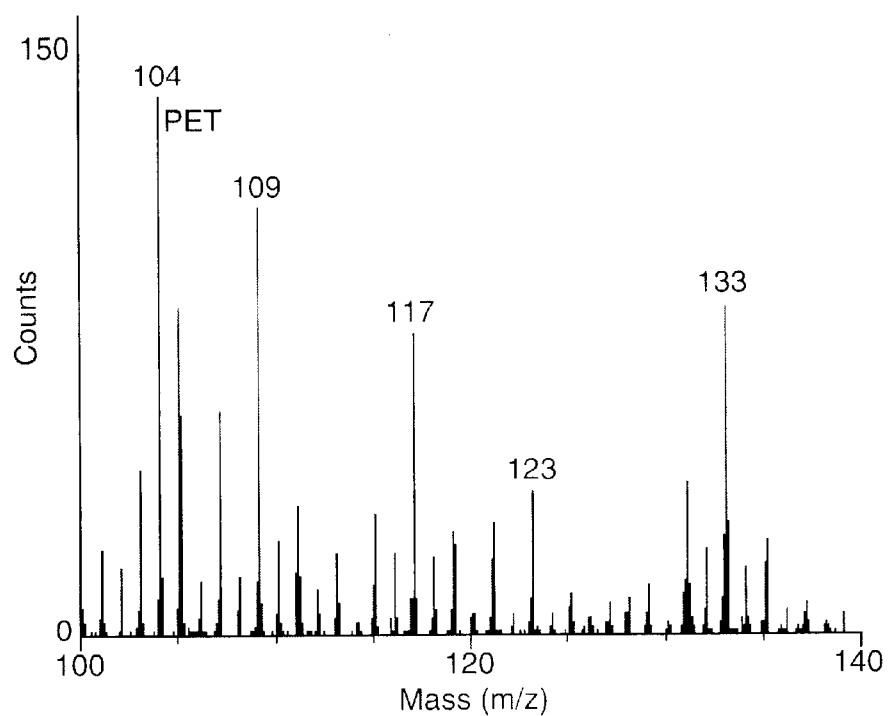
FIG. 3A is a TOF-SIMS spectrum, plotted as count vs. mass/charge (m/z), taken according to the method of the present invention.
Figure 3B:
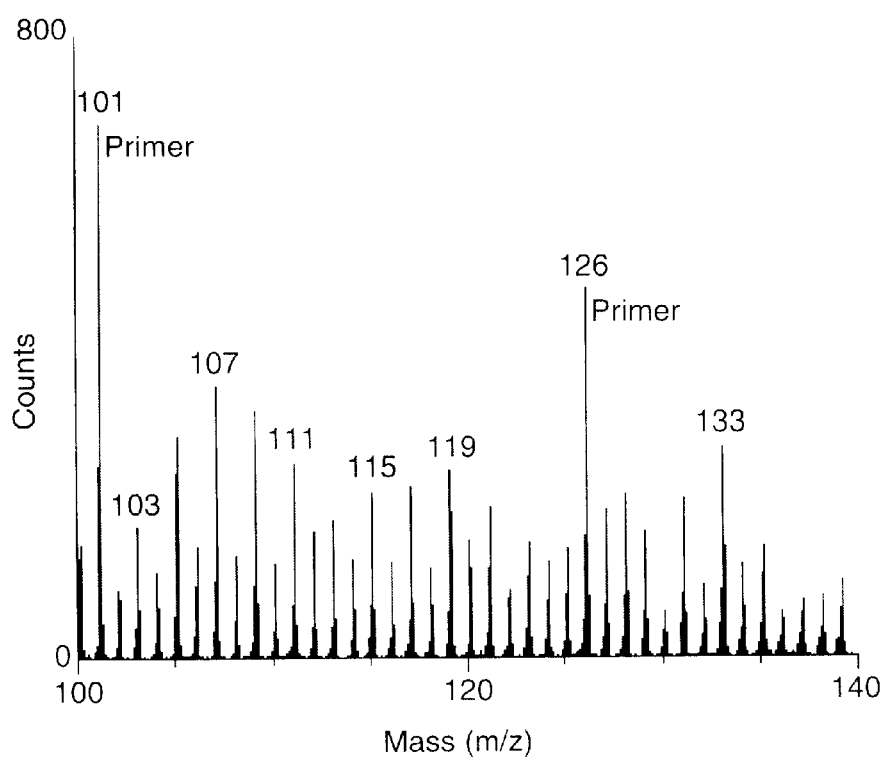
FIG. 3B is a TOF-SIMS spectrum, plotted as count vs. mass/charge (m/z), taken according to the method of the present invention.
Figure 4A:
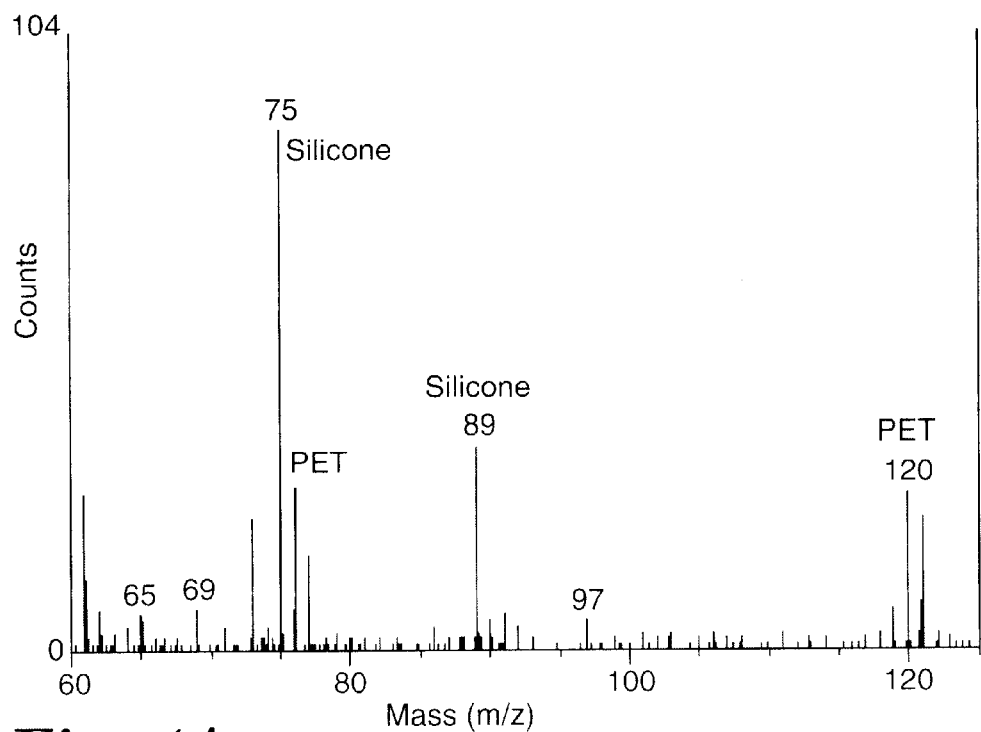
FIG. 4A is a TOF-SIMS spectrum, plotted as count vs. mass/charge (m/z), taken according to the method of the present invention.
Figure 4B:
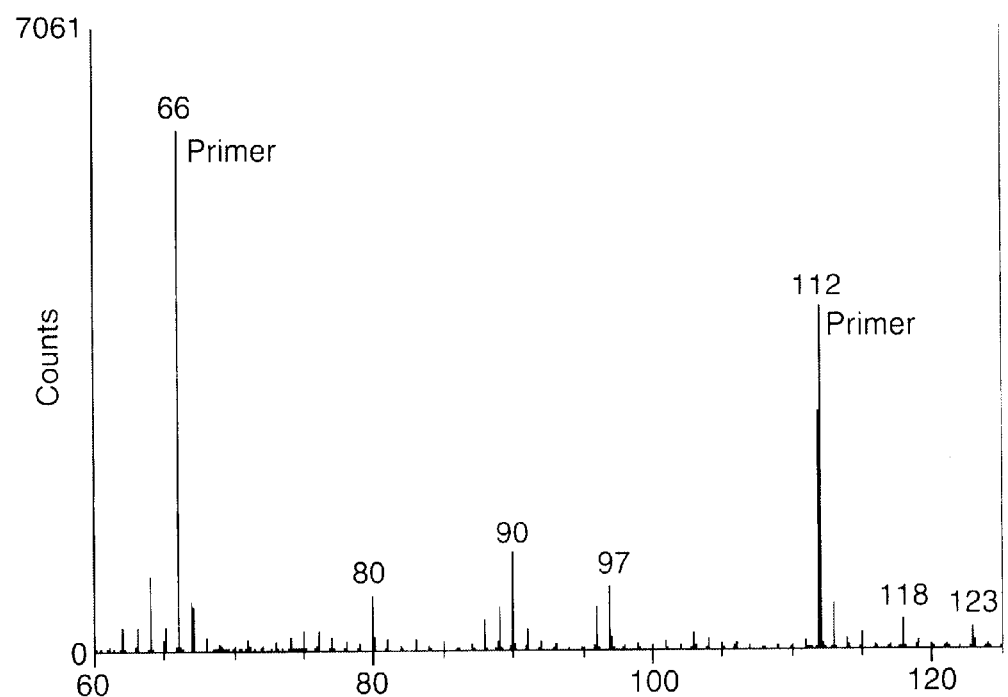
FIG. 4B is a TOF-SIMS spectrum, plotted as count vs. mass/charge (m/z), taken according to the method of the present invention.

FIGS. 3A and B and 4A and B are plots of TOF-SIMS spectra of the sample. FIGS. 3A and B are spectra of positive ions and FIGS. 4A and B are spectra of negative ions. FIGS. 3A and 4A are spectra of a crater floor location and FIGS. 3B and 4B are spectra of a surface location outside the crater. These spectra exemplify the detailed information available using the method of the present invention.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A method for the analysis of one or more buried layers of an analyte material comprising the steps of: a) removing one or more surface layers of said analyte material with an atomic force microscopy (AFM) apparatus to expose said buried layer; and b) analyzing said buried layer; wherein step b) comprises time-of-flight secondary ion mass spectrometry (TOF-SIMS).

2. An apparatus for the analysis of buried layers of an analyte material comprising an atomic force microscopy (AFM) device and a time-of-flight secondary ion mass spectrometry (TOF-SIMS) device.

3. The apparatus according to claim 2 wherein said atomic force microscopy (AFM) device and said time-of-flight secondary ion mass spectrometry (TOF-SIMS) device are contained in a chamber such that the analyte material may be transported from said atomic force microscopy (AFM) device to said time-of-flight secondary ion mass spectrometry (TOF-SIMS) device without leaving said chamber, wherein said chamber is selected from one of: i) a vacuum chamber and ii) a gas-tight chamber adapted to hold an inert atmosphere.

4. The apparatus according to claim 3 additionally comprising a master control computer functionally connected to said atomic force microscopy (AFM) device and said time-off-light secondary ion mass spectrometry (TOF-SIMS) device so as to coordinate their operation.

5. The apparatus according to claim 4 wherein said master control computer is functionally connected to at least one sample handling mechanism adapted to transport said analyte material among said atomic force microscopy (AFM) device and said additional surface analytical device(s).

6. The apparatus according to claim 4, wherein said master control computer is functionally connected to at least one mechanism regulating the internal atmosphere of the apparatus.

* * * * *

UNITED STATES PATENT AND TRADEMARK OFFICE
CERTIFICATE OF CORRECTION

PATENT NO. : 6,635,870 B1  Page 1 of 1
APPLICATION NO. : 09/425587
DATED : October 21, 2003
INVENTOR(S) : Steven J. Pachuta It is certified that error appears in the above-identified patent and that said Letters Patent is hereby corrected as shown below:

First Page, Col. 2, under (Other Publications)
Line 2, delete "*Magazine ,*" and insert -- *Magazine,* --, therefor.
  (Consider Space)
Line 25, delete "Rodriquez," and insert -- Rodriguez, --, therefor.

Sheet 4 of 5 of Drawings, (Fig. 4B)
Line 1, (Below X-axis) below "80" insert -- Mass (m/z) --.

Col. 2
Lines 1–2, delete "spectrometric" and insert -- spectrometry --, therefor.

Col. 4
Line 10, after "thousand" delete "A" and insert -- Å --, therefor.
Line 42, delete "μEm" and insert -- μm --, therefor.

Col. 5
Line 63, delete "600™" and insert -- 6000™ --, therefor.

Col. 6
Lines 54–55, in Claim 4, delete "time-off-light" and insert -- time-of-flight --, therefor.
Line 62, in Claim 6, delete "4," and insert -- 4 --, therefor.

Signed and Sealed this

Twenty-second Day of January, 2008

JON W. DUDAS
*Director of the United States Patent and Trademark Office*